Patented Nov. 9, 1948

2,453,496

UNITED STATES PATENT OFFICE 2,453,496

PROCESS OF CONVERTING NICOTINONITRILE INTO NICOTINAMIDE

James F. Couch and Charles F. Krewson, Glenside, Pa., assignors to the United States of America as represented by the Secretary of Agriculture No Drawing. Application October 19, 1943, Serial No. 506,873

1 Claim. (Cl. 260—295.5)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to a process of converting nicotinonitrile into nicotinamide, otherwise known as niacinamide.

One process of converting a heterocyclic nitrile, such as nicotinonitrile, into the corresponding amide, as heretofore practiced in the art of chemistry, involves the hydrolysis of the nitrile to the corresponding acid by boiling with a dilute mineral acid, esterification of the resulting acid with methanol or ethanol, and treating the ester so produced with ammonia to produce the amide. This process is lengthy and wasteful.

Another process, involving partial hydrolysis by heating with concentrated sulfuric acid, results in low yields and the resulting product is difficult to purify sufficiently for medicinal use.

We have discovered that such a nitrile, especially nicotinonitrile, may be converted into the corresponding amide by treatment with hydrogen peroxide and a fixed alkali, such as sodium or potassium hydroxide.

Under favorable conditions, the process as applied to nicotinonitrile gives good yields of the crude amide which may be purified to furnish substantially pure nicotinamide.

The process of the invention is exhibited in detail in the following examples:

Example I

A 2 g. sample of dried nicotinonitrile, having a melting point of 50.5°–51.5° C., and a boiling point of 205.5°–206.0° C. at 754.4 mm. pressure, was weighed into a 200 ml. round-bottom flask, and 7.56 gm. of 30 percent hydrogen peroxide (3.5 moles of hydrogen peroxide to 1 mole of nicotinonitrile) and 10 ml. of 95 percent alcohol were added. The flask containing the mixture was chilled in an ice bath and 0.95 ml. of 6.3 N. sodium hydroxide (0.31 moles of sodium hydroxide to 1 mole of nicotinonitrile) was added dropwise so that the temperature did not exceed 50° C.

After effervescence had ceased and heat was no longer evolved, the reaction mixture was heated in a water bath at 50° C. for six hours. Then the mixture, while still warm, was made neutral to litmus with 5 percent sulfuric acid and the alcohol and water were completely removed by evaporation under reduced pressure.

The dry residue thus obtained was extracted fifteen times with 10 ml. portions of hot ethyl acetate, and the product was obtained from the solution by evaporation of the ethyl-acetate, followed with drying by vacuum desiccation over phosphorous pentoxide.

The product thus obtained weighed 2.077 gm. and contained 98.75 percent nicotinamide, representing a yield of 87.4 percent of theoretical based on the nicotinonitrile used. Its melting point was 128.5°–129.0° C.

The residue left after the ethyl acetate extraction was extracted fifteen times with 10 ml. portions of 95 percent alcohol. The product obtained by evaporation of the alcohol weighed 0.2041 gm. and contained 18.17 percent nicotinamide, representing a yield of 1.58 percent of theoretical. Its melting point was indefinite, since it contained 2.72 percent nicotinic acid and a considerable quantity of sodium sulfate.

Example II

The above procedure was repeated except for varying the quantities of materials, the quantities being a 6.877 gm. sample of the nitrile, 26.0 gm. of the 30 percent hydrogen peroxide, 35 ml. of the alcohol, and 3.2 ml. of the 6.3 N. sodium hydroxide.

The dry product, resulting from evaporation of alcohol and water according to the procedure of Example I, was extracted fifteen times with 20 ml. portions of ethyl acetate. The product obtained by evaporation of the ethyl acetate weighed 7.123 gm. and contained 98.75 percent nicotinamide, representing a yield of 87.2 percent of the theoretical. Its melting point was 128°–129° C.

The product obtained by extracting the residue from the ethyl acetate extraction fifteen times with 20 ml. portions of alcohol weighed 0.8694 gm. and contained 52.46 percent nicotinamide, representing a yield of 5.65 percent of the theoretical. Its melting range was also indefinite, and it contained 1.06 percent nicotinic acid.

Other alkaline hydroxides, such as potassium, lithium, calcium, barium, and strontium hydroxides, may be substituted for sodium hydroxide in this process.

Although the above examples show that variations in proportions of the ingredients are permissible, favorable proportions for effecting the conversion are about 3.5 moles of hydrogen peroxide and about 0.3 mole of sodium or potassium hydroxide to 1 mole of the nitrile. The heating period and temperature may also be varied without sacrificing all of the advantages of the process, but favorable conditions are heating for about six hours at a temperature not exceeding 50° C.

The process can also be applied to other heterocyclic nitriles.

Having thus described the invention, what is claimed is:

A process of obtaining substantially pure nicotinamide from nicotinonitrile comprising: reacting nicotinonitrile with hydrogen peroxide and sodium hydroxide dissolved in water in the proportions of about 3.5 moles of the hydrogen peroxide and about 0.30 moles of the sodium hydroxide to 1 mole of the nicotinonitrile, in the presence of about 5 ml. of alcohol to each gram of nicotinonitrile, chilling the reaction mixture until heat is no longer evolved to maintain a temperature not substantially in excess of 50° C., then maintaining the temperature at about 50° C. for about 6 hours, then neutralizing the reaction mixture with weak sulfuric acid, removing the alcohol and water from the neutralized mixture, extracting the residue with ethyl acetate, removing the ethyl acetate, and drying the residue to obtain the purified product.

JAMES F. COUCH.
CHARLES F. KREWSON.

REFERENCES CITED

The following references are of record in the file of this patent:

UNITED STATES PATENTS

| Number | Name | Date |
| --- | --- | --- |
| 2,409,806 | Shive | Oct. 22, 1946 |
| 2,413,615 | Fox | Dec. 31, 1946 |

FOREIGN PATENTS

| Number | Country | Date |
| --- | --- | --- |
| 457,621 | Great Britain | 1936 |
| 488,642 | Great Britain | 1936 |

OTHER REFERENCES

Lucas, "Organic Chemistry," 1935, p. 295, American Book Co.

Bachmann, Helvetica Chim. Acta, vol. 26 (1943), pp. 358–362.

Annalen de Chemie, 487, p. 131.